(12) United States Patent
Kurz

(10) Patent No.: US 11,282,493 B2
(45) Date of Patent: *Mar. 22, 2022

(54) ADAPTIVE NOISE FILTERING SYSTEM

(71) Applicant: Westinghouse Air Brake Technologies Corporation, Wilmerding, PA (US)

(72) Inventor: Brian E. Kurz, Germantown, MD (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/577,913

(22) Filed: Sep. 20, 2019

(65) Prior Publication Data

US 2020/0111472 A1 Apr. 9, 2020

Related U.S. Application Data

(63) Continuation-in-part of application No. 16/152,457, filed on Oct. 5, 2018, now Pat. No. 10,453,440.

(51) Int. Cl.
| | |
|---|---|
| *G10K 11/178* | (2006.01) |
| *G08G 1/0965* | (2006.01) |
| *B60Q 5/00* | (2006.01) |
| *G10L 15/00* | (2013.01) |
| *G01H 3/00* | (2006.01) |
| *G10L 21/0208* | (2013.01) |

(Continued)

(52) U.S. Cl.
CPC .. *G10K 11/17854* (2018.01); *G10K 11/17873* (2018.01); *B60Q 5/008* (2013.01); *G01H 3/00* (2013.01); *G01H 3/08* (2013.01); *G08G 1/0965* (2013.01); *G10K 2210/1282* (2013.01); *G10K 2210/3028* (2013.01); *G10L 15/00* (2013.01); *G10L 19/00* (2013.01); *G10L 21/0208* (2013.01); *G10L 21/06* (2013.01)

(58) Field of Classification Search
CPC ....... G10K 11/17823; G10K 11/17854; G10K 11/17873; G10K 2210/1282; G10K 2210/3028; G10L 21/0208; G10L 21/02; G10L 17/26; G10L 15/00; G01H 3/08; B60Q 9/00; B60Q 5/008; B60W 30/085; G06F 3/167; B62D 41/00; G11C 7/16
See application file for complete search history.

(56) References Cited

U.S. PATENT DOCUMENTS

| | | | | |
|---|---|---|---|---|
| 5,943,428 A | * | 8/1999 | Seri | G01H 3/12 |
| | | | | 381/56 |
| 6,549,628 B1 | * | 4/2003 | Podszun | G01H 3/00 |
| | | | | 381/71.4 |

(Continued)

FOREIGN PATENT DOCUMENTS

| | | | | |
|---|---|---|---|---|
| DE | 102008062735 A1 | * | 6/2010 | ............. G08G 1/166 |
| JP | 2007292881 A | * | 11/2007 | |
| JP | 2008120283 A | * | 5/2008 | |

*Primary Examiner* — Matthew A Eason
*Assistant Examiner* — Kuassi A Ganmavo
(74) *Attorney, Agent, or Firm* — The Small Patent Law Group LLC; Christopher R. Carroll

(57) ABSTRACT

An adaptive noise filtering system and method detect sounds using a sensor onboard a vehicle system. A value of a signal associated with operation of the vehicle system is determined. One or more sounds detected by the sensor are filtered out based on the value of the signal that is determined. Operation of the vehicle system may be controlled using the remaining sound(s).

18 Claims, 3 Drawing Sheets

(51) Int. Cl.
  *G10L 21/06* (2013.01)
  *G10L 19/00* (2013.01)
  *G01H 3/08* (2006.01)

(56) References Cited

U.S. PATENT DOCUMENTS

| | | | |
|---|---|---|---|
| 2004/0133426 A1* | 7/2004 | Kimura | G10L 21/0208 704/272 |
| 2004/0138882 A1* | 7/2004 | Miyazawa | G10L 21/0208 704/233 |
| 2005/0201570 A1* | 9/2005 | Honji | G10K 15/02 381/86 |
| 2009/0030679 A1* | 1/2009 | Chengalvarayan | G10L 15/20 704/233 |
| 2009/0119099 A1* | 5/2009 | Lee | G10L 21/0208 704/226 |
| 2010/0033313 A1* | 2/2010 | Keady | G08G 1/0965 340/438 |
| 2010/0080399 A1* | 4/2010 | Pfau | B60N 2/56 381/71.4 |
| 2010/0239105 A1* | 9/2010 | Pan | G10K 11/178 381/94.9 |
| 2012/0062375 A1* | 3/2012 | Takeuchi | B60W 50/085 340/441 |
| 2012/0257763 A1* | 10/2012 | Bowden | G10K 11/1783 381/71.4 |
| 2013/0185065 A1* | 7/2013 | Tzirkel-Hancock | G10L 15/20 704/233 |
| 2016/0207528 A1* | 7/2016 | Stefan | B60W 30/06 |
| 2016/0217689 A1* | 7/2016 | Young | B60W 40/04 |
| 2018/0211648 A1* | 7/2018 | Nagai | G10K 15/00 |
| 2018/0350383 A1* | 12/2018 | Moghimi | H03G 5/165 |
| 2020/0051435 A1* | 2/2020 | Hashimoto | G06K 9/00805 |

\* cited by examiner

ADAPTIVE NOISE FILTERING SYSTEM

CROSS-REFERENCE TO RELATED APPLICATION

This application is a continuation-in-part of U.S. patent application Ser. No. 16/152,457, which was filed on 5 Oct. 2018, and the entire disclosure of which is incorporated herein by reference.

BACKGROUND

Technical Field

The subject matter described herein relates controlling sounds associated with operation of a system.

Discussion of Art

Vehicle systems such as locomotives can be equipped with audio and/or video recording devices that are strategically located to record audio and/or video events associated with the operation of the vehicle systems. In audio recordings acquired at times of relatively low background noise, sounds such as a ringing bell, a horn sounding, or human voices may be readily distinguishable from background noise. As the sound pressure level of ambient noise increases, however, it can be more difficult to distinguish sounds such as ringing bells, sounding horns, or voices in a recording.

It would, therefore, be desirable to provide a method and apparatus that enables desired sounds, such as the bell ringing, the horn sounding, or human speech in the cab of the locomotive, to be heard when playing back of recordings acquired at a time of relatively high background noise

BRIEF DESCRIPTION

In one embodiment, a method (for filtering sounds) includes detecting sounds using a sensor onboard a vehicle system, determining a value of a signal associated with operation of the vehicle system, and filtering out one or more first sounds of the sounds detected by the sensor based on the value of the signal that is determined.

In one example, a noise filtering system includes a controller configured to determine a value of a signal associated with operation of a vehicle system. The controller also is configured to filter out one or more first sounds of sounds detected by a sensor onboard the vehicle system based on the value of the signal that is determined. The controller also can be configured to control operation of the vehicle system based on one or more second sounds of the sounds that remain after the one or more first sounds are filtered out from the sounds detected by the sensor.

In one example, a method (e.g., for sound filtering) includes converting a first sound received by a first transducer into a first analog electrical signal, converting a second ambient sound received by the first transducer or a second transducer into a second analog electrical signal, comparing a value of a signal associated with operation, movement, or both operation and movement of a vehicle system to a reference value, storing a digitized version of the first analog electrical signal responsive to the value of the signal being no greater than the reference value, and storing a digitized and filtered version of the second analog electrical signal responsive to the value of the signal being greater than the reference value.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
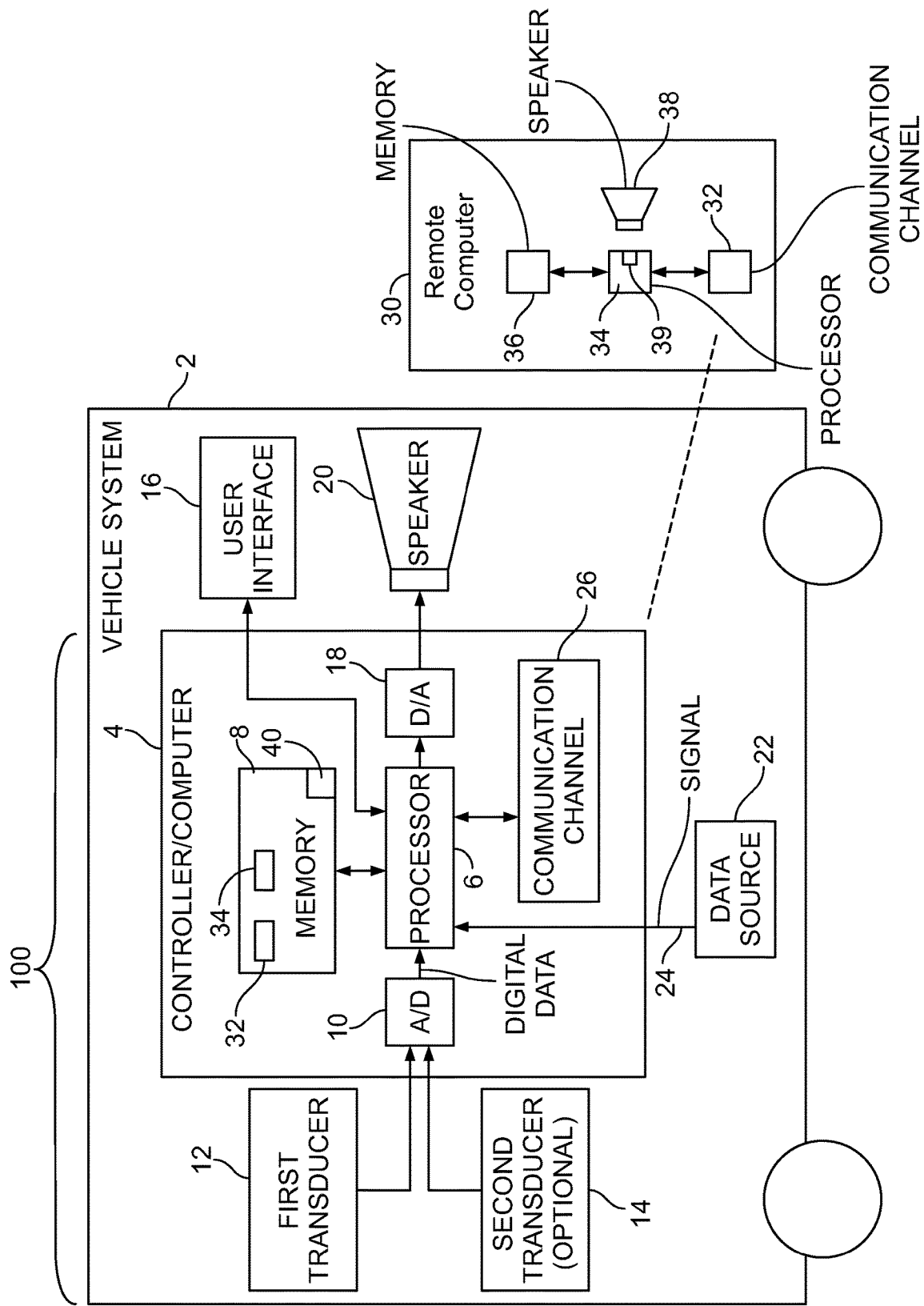
FIG. 1 illustrates one example of an adaptive noise filtering system disposed onboard a vehicle system.

Embodiments of the subject matter described herein relate to adaptive noise filtering systems and methods that filter unwanted background noise or ambient sound associated with the operation of a vehicle system to isolate certain sounds. The filtered sounds can be recorded for playback at a later time. The ambient sound can be filtered to isolate and record sounds associated with operation of the vehicle system, such as sounds created by the vehicle system to warn others, voices of operators onboard the vehicle systems, and the like. For example, horn sounds, bell sounds, and/or sounds (e.g., voices) in the vehicle system may be isolated. Via this isolation, the system and method can avoid the sounds of a horn, bell, and/or voices in a vehicle system from being can be drowned out by background noise. The background noise can be environmental sounds (e.g., wind noise), background noise of the vehicle system operating (e.g., engine noise, dynamic braking resistor bank noise) as opposed to sounds created to issue a warning, human speech (other than voices in the cab), and the like.

While one or more embodiments described herein relate to adaptively filtering audible noise from recordings, not all embodiments are limited in this way. At least one embodiment relates to filtering audible noise as a sensor (e.g., a microphone, transducer, piezoelectric elements, etc.) detects the noise. For example, the systems and methods can filter some frequencies of sounds as the sounds are sensed to enable the systems and methods to more accurately detect sounds of other frequencies. Additionally, at least one embodiment relates to adaptive filtering of noise other than acoustic noise. Noise may occur in electric signals. External effects such as vibrations, electromagnetic interference, and the like, can generate noise in the electric signals. The system and method described herein can use detected operational settings of a vehicle system to determine when noise in electric signals is occurring or more likely to occur. The system and method can then filter out at least some of the noise in the electric signals based on this detection.

The system and method can examine one or more operational settings of the vehicle system to determine when and/or whether to filter certain background noises. For example, the system and method can examine the throttle setting of a vehicle system to determine when to filter out background noise associated with operation of the vehicle system. As another example, the current, anticipated (e.g., predicted and/or planned) speed of the vehicle system can be examined to determine when to filter out background noise associated with operation of the vehicle system. The system and method can detect movement (e.g., acceleration) of the vehicle system (e.g., using an accelerometer, tachometer, or the like) and filter background noise associated with operation of the vehicle system based on the detected movement. With respect to braking, the system and method can detect brake commands (e.g., to engage brakes of a vehicle system) and, responsive to detecting a brake command, filter out noises such as brake system air venting noise from recorded sounds.

The system and method can use noise cancelling to filter out background noises at selected frequencies or within selected frequency bands. These frequencies can be associated with different sounds, such as known or previously identified background noises (e.g., engine noise, noise associated with the use of dynamic braking resistor banks, etc.), wind noise, and/or human speech.

FIG. 1 illustrates one example of an adaptive noise filtering system 100 disposed onboard a vehicle system 2. Optionally, some or all of the filtering system may be off-board the vehicle system. The filtering system includes a controller (or computer) 4 that represents or includes one or more processors 6 that perform the operations described herein (associated with the controller). The filtering system also includes a memory 8, such as non-volatile memory (e.g., flash memory (ROM) or a hard drive) that can be utilized for long-term storage of programs and/or data, and/or volatile memory (e.g., RAM), which can be used for short-term storage of programs and/or data during operation of the processors 6. The controller 4 can be programmed or configured to operate in the manner described hereinafter and, more particularly, the processors 6 can operate in accordance with a program stored in memory 8 in the manner described hereinafter.

The controller 4 can include an analog-to-digital converter (A/D) 10 for converting an analog electrical signal output by a first transducer 12 into corresponding digital data for processing by processor 6 in the manner described hereinafter. Each of the first transducer 12 and the optional second transducer 14 can be a microphone or other noise sensor (e.g., a piezoelectric transducer). The A/D 10 can also be configured to process the output of a second, optional transducer 14 into corresponding digital data for processing by processors 6 in the manner described hereinafter.

A user interface 16 can be provided to enable a user to interface with a program running on the processors 6. In an example, the user interface 16 can include a visual display and a means for entry of data and/or commands into the processors 6. The means for entry of data and/or commands can include the display being a touch panel display. In another example, the means for entry of data and/or commands can include a mouse and/or a keyboard. The particular implementation of the means for entering data and/or commands is not to be construed in a limiting sense.

The controller 4 can also include a digital-to-analog converter (D/A) 18 which can convert digital data output by processor 6 into an analog signal which can be provided to a speaker 20 or other device capable of converting the analog signal into audible sound.

The vehicle system 2 can also include a data source 22 which can output (to the processors 6) a signal 24 having a value that can change with operation, movement, or both of the vehicle system 2. The value of the signal 24 can change in response to one or more of the following: a change of the control (e.g., throttle) setting of the vehicle system, a change in the speed of the vehicle system, a change in the acceleration or deceleration of the vehicle system, and/or a change in a (e.g., brake) command of the vehicle system.

In one example, the data source 22 can include or be part of a vehicle control system that can process or output one or more control settings and/or commands for controlling the operation of the vehicle system 2. The speed and/or acceleration of the vehicle system can be provided to controller 4 by sensors such as, for example, a speedometer, an accelerometer, a wheel revolution sensor, or the like. The value of the signal 24 and/or any changes in the value of the signal 24 can represent other operation and/or movement associated with the vehicle system 2 that can result in an increase in a volume of sound output by or associated with the operation of the vehicle system 2.

The vehicle system 2 is shown as a single vehicle, but optionally may be formed from two or more vehicles. These vehicles may be mechanically coupled with each other to move as the vehicle system 2. Alternatively, the vehicles may be logically coupled but mechanically decoupled. For example, the vehicles may communicate with each other to coordinate the movements of the vehicles with each other so that the vehicles travel together as the vehicle system 2.

Increasing the throttle setting of the vehicle system 2 can result in an increase in the background noise within the vehicle system 2, for example, within the cab of the vehicle system. In another example, increasing the speed of the vehicle system 2 can result in an increase in the background noise within the vehicle system 2 due to engine noise, increased wind noise, and/or vibration. In another example, increasing acceleration of the vehicle system 2 can result in an increase in the background noise in the vehicle system 2 due to engine noise, increased wind noise, and/or increased vibration. In yet another example, outputting a brake command to increase the level of braking can result in an increase in the background noise within the vehicle system 2 due to the operation of the brakes, such as, for example, brake system air venting noise.

The controller 4 can include or use a communication channel 26 to transfer data from controller 4 to a remote computer 30 for processing. This channel can be formed from one or more conductive connections (e.g., wires, buses, cables, etc.), one or more optic connection (e.g., fiber optic cable), one or more wireless communications, or a combination thereof.

The communication channel 26 can have a form and/or protocol that can be utilized to transfer data from the controller 4 to one or more remote computers 30. Non-limiting examples of communication channels can include a wireless connection, a wired connection, a data transfer port, such as, for example, a USB port, and the like.

The filtering system can operate by the first transducer 12 converting first and second sounds received by first transducer 12 at first and second periods of time into first and second electrical signals. In this example, the sound pressure level of the second sound received by first transducer 12 during the second period of time can be greater than the sound pressure level of the first sound received by first transducer 12 during the first period of time.

The first and second electrical signals output by first transducer 12 can be analog signals which can be converted by A/D 10 into digital data for processing and storage in the memory 8 by the processors 6. The first period of time and the second period of time can be different (and not overlap with each other), can partially overlap with each other (e.g., the beginning or end of the first time period differs from that of the second time period), or can entirely overlap with each other (e.g., the beginning and end of the first time period is the same as the second time period).

The processors 6 can compare the value of the signal 24 output by the data source 22 (associated with operation, movement, or both of the vehicle system) to a reference value 40 that can be stored in the memory 8. In response to determining that the value of signal 24 is one of (a) less than or (b) greater than the reference value 40 during the first period of time where the first sound pressure level is, for example, less than a threshold associated with the reference value 40, the controller 4 can store a first digitized version of the first sound 32 in the memory 8. In response to the value of signal 24 being the other of (a) less than or (b) greater than reference value 40 during the second period of time when the second sound pressure level is, for example, greater than the threshold associated with reference value 40, the controller 4 can store a second digitized version of the second sound 34 in the memory 8. This second version can be filtered in a frequency spectrum associated with the second digitized version of the second sound. In an example, the first digitized version of the first sound 32 can be unfiltered in the frequency spectrum associated with the first digitized version of the first sound 32. The second digitized version of the second sound 34 can be filtered in a frequency spectrum associated with the second digitized version of the second sound.

The sound pressure level of the first sound received by first transducer 12 during the first period of time can be of a sufficiently low level that one or more sounds associated with the operation and/or movement of vehicle system 2 that are desired to be recorded are not masked by background noise. Examples of sounds that can be desired to be recorded include the bell ringing, the horn sounding, and/or human speech occurring in the vehicle system. In contrast, the second sound pressure level of the second sound received by first transducer 12 during the second period of time can be of a sufficiently high level that includes background noise that can mask sounds associated with the operation and/or movement of vehicle system 2 that are desired to be recorded. Examples of such background noise can include wind noise; engine noise occurring during steady state operation, acceleration, or deceleration; and/or brake system air venting noise.

The reference value 40 stored in memory 8 can set a threshold for filtering or not filtering sound received by first transducer 12 based on the value of signal 24 output by locomotive data source 22. By way of the value of signal 24 and reference value 40 stored in memory 8, the controller can determine whether to filter or not filter digitized versions of sounds received by the first transducer 12 based on operation, movement, or both of the vehicle system 2 without reference to the amplitudes of signals output by the first transducer 12.

The controller can determine to store a filtered or an unfiltered digitized version of a sound in memory 8 in a preemptive manner. For example, the value of signal 24 can be based on the throttle setting of the vehicle system 2. Increasing the throttle setting to increase the speed of vehicle system 2 may result in an increase in the sound pressure level (SPL) of the sound and in the background noise detected by the first transducer 12. Accordingly, upon the value of signal 24 increasing above the reference value 40 in response to increasing the throttle setting, the digitized version of the second sound received by first transducer 12 can be digitized and filtered in a frequency spectrum associated with the anticipated, expected, or previously measured background noise to be produced by the vehicle system 2. The second, filtered digitized version of the second sound 34 can be stored in the memory 8. The second, filtered digitized version of the second sound 34 can include one or more amplitudes suppressed at frequencies associated with background noise, where desired sounds associated with operation of the vehicle system 2 can be recorded without being masked or occluded by background or other noises.

If the value of the signal 24 decreases (or increases) below (or above) reference value 40, the controller 4 can store the first, unfiltered digitized version 32 of the first sound received by the first transducer 12 in the memory 8. Where unwanted background noise is predetermined to be at a level that does not interfere with recording of desired sounds to be recorded (associated with the operation of the vehicle system 2), an unfiltered frequency spectrum of the sound received by first transducer 12 can be recorded.

The process of converting an analog signal to a digital format (compressed or uncompressed) and converting the digital format back into an analog signal may result in filtering of amplitudes and/or frequencies associated with the frequency spectrum of the original analog signal. Accordingly, in one embodiment, an unfiltered digitized version of a sound received by a transducer is not further filtered by the system or method over any filtration that may naturally occur during the process of converting the original analog sound into a digital format and then converting the digital format back into an analog sound. Moreover, a filtered digitized version of a sound received by a transducer can be intentionally filtered by the system or method in addition to filtering that may naturally occur during the process of converting an analog signal into a digital format and then converting the digital format back into an analog signal.

The first, unfiltered digitized version of the first sound 32 can include an unfiltered frequency spectrum. In one embodiment, the second, filtered digitized version of the second sound 34 can include one or more amplitudes of a frequency spectrum of the digitized version of the second sound that are suppressed, one or more frequencies of the frequency spectrum of the digitized version of the second sound that are removed, or a combination of suppressing one or more amplitudes and removing one or more frequencies. In an example, the one or more frequencies can be removed and/or the one or more amplitudes can be suppressed at frequencies associated with background noise associated with the operation of the vehicle system 2. These frequencies can be previously identified or measured from previous recordings during prior travels of the vehicle system.

The sound received by the first transducer 12 during the first period of time can be a first analog sound that the first transducer 12 converts into a first analog electrical signal. Similarly, the sound received by first transducer 12 during the second period of time can be a second analog sound that the first transducer 12 converts into a second analog electrical signal. Each of the first and second analog electrical signals output by first transducer 12 can be a time domain representation of the first and second analog sounds received by first transducer 12.

Each of the first and second analog electrical signals can be converted by the A/D 10 into first and second digitized versions of the first and second analog electrical signals. In an example, in response to the value of signal 24 being less than the reference value 40, the digitized version of the first analog electrical signal can be stored unfiltered in memory 8 as a digital representation of a time domain signal. This representation optionally can be referred to as the first, unfiltered digitized version of the first sound 32. Optionally, the digitized version of the first analog electrical signal can be stored unfiltered in the memory 8 as a digital representation of the time domain signal responsive to the value of the signals being greater than the reference value 40.

In another example, when the value of signal 24 is greater than the reference value 40, the digitized version of the second analog electrical signal can be converted into a frequency domain representation which can then be filtered in the frequency domain to suppress and/or remove one or more amplitudes and/or frequencies associated with unwanted background noise. Alternatively, the digitized version of the second analog electrical signal can be converted into the frequency domain representation that is then filtered to suppress and/or remove one or more amplitudes and/or frequencies associated by unwanted background noise responsive to the value of the signal 24 being no greater than the reference value or being smaller than the reference value.

The filtered frequency domain representation can then be stored in the memory 8 or can first be converted back into a time domain representation which can then be stored in the memory 8 as the second filtered digitized version of the second sound 34. Therefore, the digitized and filtered version of the second analog signal can be stored in the memory 8 as either a filtered frequency domain representation or a filtered time domain representation.

Each digital representation of a time domain signal can be stored in an uncompressed format. In another example, each digital representation of a time domain signal can be stored in a compressed format that can be a lossless format. Examples of such a format include Free Lossless Audio Codec (FLAC), or a lossy format, such as MP3.

The digital representation of a time domain signal that is stored in the memory 8 in a compressed format can be decompressed by the controller 4 (e.g., the processors 6) prior to output to the D/A 18. In contrast, each digital representation of a time domain signal that is stored in memory in an uncompressed format can be output directly to the D/A 18. In an example, the digitized version of an analog electrical signal output to the D/A 18 can be provided directly to the D/A 18 when stored in an uncompressed format in the memory 8, or uncompressed and provided to D/A 18 when stored in memory 8 in a compressed format. The compression or decompression of signals can be part of the storage and retrieval of digitized versions of analog electrical signals into and from the memory 8.

In one example, when the first, unfiltered digitized version of the first sound 32 stored in memory 8 is converted back into audible sound, the controller 4 (e.g., the processors 6) can output the first, unfiltered digitized version of the first sound 32 to the D/A 18. The D/A 18 can convert the same back into an analog electrical signal which can then be converted into an audio sound by the speaker 20. Similarly, if the second, filtered digitized version of the second sound 34 is stored in the memory 8 as a time domain representation, the controller 4 (e.g., the processors 6) can output the second, filtered digitized version of the second sound 34 to the D/A 18. The D/A 18 can then convert the same back into an analog electrical signal which can be converted into audible sound by speaker 20.

If the second, filtered digitized version of the second sound 34 is stored in the memory 8 as a frequency domain representation, this frequency domain representation can first be converted by the controller 4 (e.g., the processors 6) back into a digital time domain representation. The digital time domain representation can then be output to the D/A 18 for conversion back into an analog electrical signal which can be converted to audible sound by speaker 20. In this example, the audible sound output by speaker 20 in response to receiving the analog electrical signal from D/A 18 can include sounds associated with unwanted noise suppressed or removed, whereupon desired sounds to be heard can be more pronounced.

In one example, the controller 4 can use a discrete or fast Fourier transform (DFT or FFT) to convert the digitized version of the second, analog electrical signal output by A/D 10 from a distal time domain representation to a frequency domain representation. This frequency domain representation can then be filtered to suppress and/or remove one or more amplitudes and/or frequencies of its frequency spectrum.

The filtered frequency domain representation can be stored in the memory 8 as the second, filtered digitized version of the second sound 34. Alternatively, prior to storage in the memory 8, this filtered frequency domain representation can first be back-converted into a digital time domain representation. The digital time domain representation can then be stored in the memory 8 as the second, filtered digitized version of the sound 34.

In the case where a DFT or FFT was performed on a digital time domain representation to convert the digital time domain representation to a frequency domain representation stored in the memory 8, the frequency domain representation can be back-converted into a digital time domain representation using an inverse discrete or inverse fast Fourier transform (IDFT or IFFT) at the time of playback of the second, filtered digitized version of the second sound 34. This digital time domain representation can then be converted by the D/A 18 into an analog electrical signal which can be converted to audible sound by the speaker 20.

In one example, a method of noise filtering in the vehicle system 2 can include utilizing second transducer 14 in addition to first transducer 12. The first transducer 12 can be used to record sound when the value of signal 24 is below (or, alternatively, above) the reference value 40 stored in memory 8 and second transducer 14 can be used to record sound when the value of signal 24 is above (or, alternatively, below) the reference value 40 stored in memory 8. In one example, the first and second transducers 12 and 14 can be positioned at different locations on the vehicle system 2 to record sounds of interest. For example, the first transducer 12 can be located generally in the cab of the vehicle system 2 to receive sound present in the cab. In an example, the second transducer 14 can be positioned on the vehicle system 2 at a location where the second transducer 14 can more readily detect the bell of the vehicle system 2 or the horn of the vehicle system 2 sounding (e.g., outside of the cab). In an example, the second transducer 14 can be positioned in proximity to the operator of the vehicle system 2 to detect the operator's voice.

In one example, the method of noise filtering on the vehicle system 2 that uses the first transducer 12 and the second transducer 14 can include the first transducer 12 converting a first sound received by the first transducer 12 at a first sound pressure level during a first period of time into a first analog electrical signal. The second transducer 14 can convert a second sound received by the second transducer 14 at a second sound pressure level during a second period of time into a second analog electrical signal. The second sound pressure level can be greater than the first sound pressure level. The first period of time and the second period of time can be different or can partially overlap.

The controller 4 can compare the value of the signal 24 related to operation, movement, or both of the vehicle system 2 during the first and second periods of time to the reference value 40 stored in the memory 8. In response to the value of signal 24 being less than (or, alternatively, greater than) the reference value 40 during the first period of time, the first analog electrical signal can be digitized by the A/D 10, and the controller 4 can store a digitized version of the first, analog electrical signal in the memory 8. In an example, this digitized version of the first analog electrical signal can be unfiltered. This unfiltered, digitized version of the first analog electrical signal can be stored in the memory 8 as a first, unfiltered digitized version of the first sound 32.

The controller 4 can store a digitized and filtered version of the second, analog electrical signal in the memory 8 in response to the value of signal 24 being greater than (or, alternatively, less than) the reference value 40 during the second period of time. The second analog electrical signal can be digitized by A/D 10 and filtered by the controller 4. This filtered, digitized version of the second analog electrical signal can be filtered utilizing an algorithm, such as a DFT or FFT, as a second, filtered digitized version of the second sound 34.

The second, filtered digitized version of the second sound 34 can be stored in the memory 8 as a digital time domain representation of the second sound. In one example, the process of storing the second, filtered digitized version of the second sound 34 in the memory 8 can include first converting the second, filtered digitized version from a digital time domain representation into a frequency domain representation and then filtering the frequency domain representation to suppress and/or remove one or more amplitudes and/or frequencies of the frequency domain representation. In an example, this filtered frequency domain representation can be stored in the memory 8 as the second, filtered digitized version of the second sound 34. In another example, prior to storage in memory 8, the filtered frequency domain representation can be back-converted, e.g., via an IDFT or IFFT, into a digital time domain representation which can then be stored in the memory 8 as the second, filtered digitized version of the second sound 34. Conversion of the second, analog electrical signal from the digital time domain representation into the frequency domain representation can include determining a forward Fourier transform of the second analog electrical signal. The step of back-converting the filtered frequency domain representation to a time domain representation can include determining an inverse Fourier transform of the filtered frequency domain representation. The second, filtered digitized version of the second sound 34 can include amplitudes and/or frequencies filtered from a frequency spectrum associated with the second analog signal.

The value of the signal 24 or changes to the value of signal 24 can be based on at least one of the following: a control (e.g., throttle) setting or change of control setting of the vehicle system 2; a speed or change in speed of the vehicle system 2; an acceleration or change in acceleration of the vehicle system 2; and/or a brake command or a change in a brake command of the vehicle system 2. The amplitudes and/or frequencies filtered from the frequency spectrum associated with the second analog electrical signal can include, for example, frequencies associated with one or more of the following: wind noise; engine noise of the vehicle system 2 during steady state operation (e.g., the engine speed is not changing), acceleration, or deceleration; and/or brake system air venting noise.

The speaker 20 can be utilized to convert into sound the first, unfiltered digitized version of the first sound 32, the second, filtered digitized version of the second sound 34, or both. While some examples herein describe the transducers 12, 14 as separate devices, alternatively, the transducers 12, 14 are a single transducer.

Figure 2:
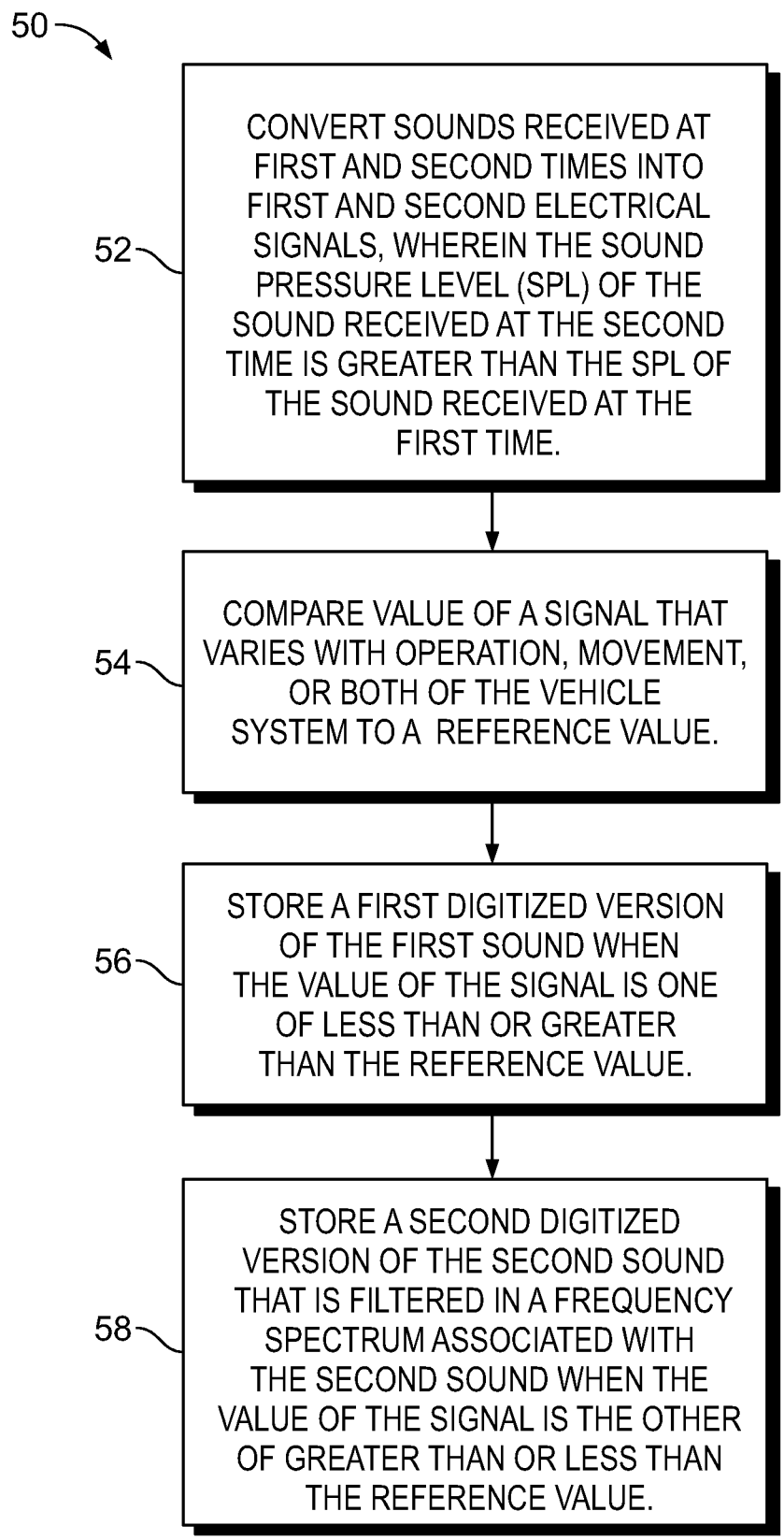
FIG. 2 illustrates a flowchart of one example of a method for adaptively filtering noise.

FIG. 2 illustrates a flowchart of one example of a method 50 for adaptively filtering noise. The method can be performed by the noise filtering system or another system. At 52, sounds received at different times (e.g., different intervals, durations, or periods of time) are converted into first and second electrical signals. In an example, the sound pressure level (SPL) of the sound received at the second time can be greater than the SPL of the sound received at the first time. Alternatively, the different sounds can be received at the same time (e.g., by different transducers or microphones, or by the same transducer or microphone).

At 54, the value of a signal 24 that varies with operation and/or movement of the vehicle system 2 is compared to a reference value 40. This signal can represent a throttle setting of the vehicle system 2, an engine speed of the vehicle system 2, a moving speed of the vehicle system 2, a brake setting of the vehicle system 2, a location of the vehicle system 2 (e.g., the vehicle system 2 being located in an urban or more heavily populated area versus a rural or less populated area), the amount of vehicular traffic in the vicinity of the vehicle system 2 (e.g., whether the vehicle system 2 is traveling within a threshold distance of several other vehicles or vehicle systems), etc.

At 56, a first digitized version of the first sound is stored in memory 8 when the value of signal 24 is one of less than or no less than the reference value 40. At 58, a second digitized version of the second sound that is filtered in a frequency spectrum associated with the second sound is stored in memory 8 when the value of the signal 24 is the other of greater than or no greater than the reference value 40.

Figure 3:
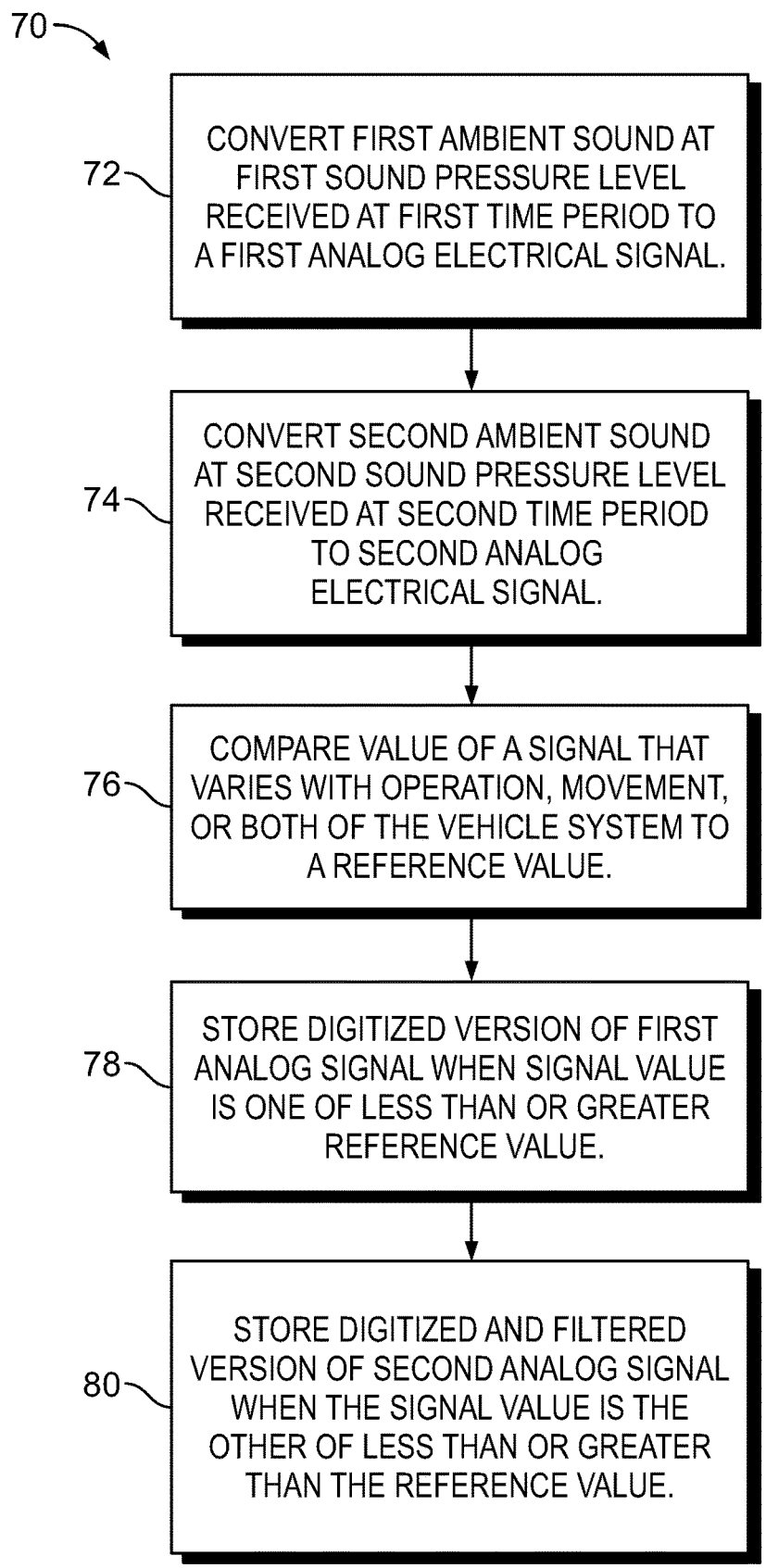
FIG. 3 illustrates a flowchart of another example of a method for adaptively filtering noise.

FIG. 3 illustrates a flowchart of one example of a method 70 for adaptive noise filtering. At 72, a first ambient sound at a first sound pressure level received at a first time period is converted into a first analog electrical signal. At 74, a second ambient sound at a second sound pressure level received at a second time period is converted into a second analog electrical signal. At 76, the value of a signal 24 that varies with operation and/or movement of the vehicle system 2 is compared with a reference value 40.

At 78, a digitized version of the first analog signal is stored in memory 8 when the value of the signal 24 is one of less than or no less than the reference value 40. At 80, a digitized and filtered version of the second analog signal is stored in memory 8 when or responsive to the value of the signal 24 is the other of less than or no less than the reference value 40.

In these methods, the value of the signal 24 indicates an operational state of the vehicle system 2. For example, the signal 24 can indicate the throttle setting, engine speed, brake setting, moving speed, or the like, of the vehicle system 2. The signal 24 can be compared to a threshold associated with an operational state in which detected sounds may need to be filtered to accurately detect other sounds. For example, the threshold can be a throttle setting, engine speed, brake setting, moving speed, or the like, at which or above desired sounds can be more difficult to separate from other sounds of operation of the vehicle system 2 (and/or environmental sounds, such as the wind). At operational states at or above the threshold, desired sounds may not be detectable or discernible (e.g., by the controller and/or a human listener of the recorded sounds) from the operational and/or ambient sounds of operation of the vehicle system 2. Therefore, responsive to detecting that the throttle setting, engine speed, moving speed, brake setting, etc., of the vehicle system 2 is at or above the threshold, the filtering system may determine that filtering of some frequencies and/or amplitudes of the detected sounds may be needed. This filtering may be needed to remove or partially suppress sounds that are not desired to be detected. For example, the louder sounds of the engine operating, the brakes being engaged, the wind moving by the vehicle system 2, the wheels of the vehicle system 2 rubbing or striking the route more loudly etc., may result in the filtering system needing to remove and/or suppress some frequencies of detected sounds. The filtering system can remove the frequencies and/or reduce the amplitude (e.g., volume) of these frequencies of the detected sounds that are associated with these sounds to allow for other sounds to be more readily discernible or detectable. This can result in desired sounds being louder or otherwise more discernible. For example, the sounds associated with other frequencies that are not removed or have suppressed amplitudes may become louder relative to the frequencies of the removed or suppressed sounds.

The filtered version of signals representative of detected sounds can be communicated or transferred to a remote computer 30 via a communication channel 26 of the controller 4 and the communication channel 32 of the remote computer 30. The communicated or transferred digitized, unfiltered version and/or digitized, filtered version of an analog electrical signal can be stored in memory 36 of remote computer 30. In an example, a processor 34 of remote computer 30 can output any one or more of the digitized version and/or the digitized, filtered version of an electrical signal to a D/A 39 for conversion to an analog signal for playback by a speaker 38 of remote computer 30. In an example, remote computer 30 can be a personal computer which can be programmed or configured to playback any digitized, unfiltered version or digitized, filtered version of an analog electrical signal produced by first transducer 12 and/or second transducer 14 remote from the environment of vehicle system 2, e.g., for analysis of the sounds of vehicle system 2 recorded during an incident.

But, not all embodiments of the inventive subject matter described herein are limited to post-incident analysis of sounds. One or more embodiments of the adaptive noise filtering systems and methods described herein can be used during operation of the vehicle system to control and/or monitor operations of the vehicle system. For example, the adaptive noise filtering system and method can operate in real-time to filter out sounds associated with some frequencies. This can allow for sounds of other frequencies to become louder or more prominent than these sounds would otherwise be without filtering. The controller can then use the filtered sounds to automatically control (or change control) of operation of the vehicle system. Optionally, the controller can use the filtered sounds to direct an operator to manually change operation of the vehicle system. In one embodiment, an active noise canceling device provides countercyclical noise in a determined point or region that selectively cancels noise and/or vibration at that point or region. The noise canceling device may identify operational noise by, for example, only eliminating or canceling periodic and repetitive waveforms while allowing random or predetermined waveforms to propagate without cancellation. Multiple microphones and/or active noise canceling devices may be deployed based on application specific parameters. This device can be the adaptive noise filtering system described herein.

As one example, based on the filtered sounds, the controller can direct the vehicle system to slow down or stop movement, to change from traveling on one route to traveling onto another route, to increase speed, to change music or radio being played in the vehicle system, or to change one or more other operations of the vehicle system. The controller can direct this action by sending signals to an engine control unit of the vehicle system, an engine of the vehicle system, a brake system of the vehicle system, or the like. The filtered sounds (e.g., the sounds that remain after filtering out other sounds) can indicate the presence of an object on the route ahead of the vehicle system (e.g., based on an alarm, bell, horn, or the like), which may need the vehicle system to slow or stop, or change routes, to avoid collision. Or, the filtered sounds can be voice commands of an operator to change movement or other operations of the vehicle system.

In one embodiment, a method (for filtering sounds) includes detecting sounds using a sensor onboard a vehicle system, determining a value of a signal associated with operation of the vehicle system, and filtering out one or more first sounds of the sounds detected by the sensor based on the value of the signal that is determined.

Optionally, the method also can include controlling operation of the vehicle system based on one or more second sounds of the sounds that remain after filtering out the one or more first sounds. The operation of the vehicle system that is controlled based on the one or more second sounds may include slowing down movement of the vehicle system, stopping the movement of the vehicle system, and/or changing which route the vehicle system is moving along.

The value of the signal that is determined may represent a throttle setting of the vehicle system, a brake setting of the vehicle system, a moving speed of the vehicle system, and/or an engine speed of the vehicle system.

The one or more first sounds may be filtered by removing one or more frequencies from the sounds that are detected and/or reducing one or more amplitudes of the one or more frequencies of the sounds that are detected. The one or more frequencies may be associated with the one or more first sounds. The one or more frequencies of the one or more first sounds may be associated with engine noise, wind noise, and/or noise generated by movement of the vehicle system.

Optionally, filtering of the one or more first sounds occurs responsive to the value of the signal exceeding a threshold. The method also may include saving a recording of the one or more second sounds responsive to the value of the signal exceeding the threshold. Responsive to the value of the signal not exceeding the threshold, the sounds may be saved in a recording with the one or more first sounds and the one or more second sounds.

In one example, a noise filtering system includes a controller configured to determine a value of a signal associated with operation of a vehicle system. The controller also is configured to filter out one or more first sounds of sounds detected by a sensor onboard the vehicle system based on the value of the signal that is determined. The controller also can be configured to control operation of the vehicle system based on one or more second sounds of the sounds that remain after the one or more first sounds are filtered out from the sounds detected by the sensor.

Optionally, the controller is configured to slow down movement of the vehicle system, stop the movement of the vehicle system, and/or change which route the vehicle system is moving along as the operation of the vehicle system that is controlled based on the one or more second sounds. The controller may be configured to determine a throttle setting of the vehicle system, a brake setting of the vehicle system, a moving speed of the vehicle system, and/or an engine speed of the vehicle system as the value of the signal.

The controller may be configured to filter the one or more first sounds by removing one or more frequencies from the sounds that are detected and/or reducing one or more amplitudes of the one or more frequencies of the sounds that are detected. The one or more frequencies may be associated with the one or more first sounds. The one or more frequencies of the one or more first sounds may be associated with engine noise, wind noise, and/or noise generated by movement of the vehicle system.

In one example, a method (e.g., for sound filtering) includes converting a first sound received by a first transducer into a first analog electrical signal, converting a second ambient sound received by the first transducer or a second transducer into a second analog electrical signal, comparing a value of a signal associated with operation, movement, or both operation and movement of a vehicle system to a reference value, storing a digitized version of the first analog electrical signal responsive to the value of the signal being no greater than the reference value, and storing a digitized and filtered version of the second analog electrical signal responsive to the value of the signal being greater than the reference value.

Optionally, the value of the signal is associated with a control setting of the vehicle system, a moving speed of the vehicle system, an engine speed of the vehicle system, an acceleration of the vehicle system, and/or a command of the vehicle system.

The digitized and filtered version of the second analog electrical signal may include frequencies filtered from a frequency spectrum associated with the second analog electrical signal. The frequencies may be associated with wind noise, engine noise, and/or brake system noise.

The method optionally can include changing an operational state of the vehicle system based on the digitized and filtered version of the second analog electrical signal.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
   detecting sounds using a sensor onboard a vehicle system;
   determining a value of a signal associated with operation of the vehicle system;
   filtering out one or more first sounds of the sounds detected by the sensor based on the value of the signal that is determined responsive to the value of the signal exceeding a threshold, wherein one or more second sounds of the sounds remain after the one or more first sounds are filtered;
   recording the one or more second sounds responsive to the value of the signal exceeding the threshold; and
   recording the one or more first sounds and the one or more second sounds responsive to the value of the signal not exceeding the threshold.

2. The method of claim 1, further comprising:
   controlling operation of the vehicle system based on the one or more second sounds.

3. The method of claim 2, wherein the operation of the vehicle system that is controlled based on the one or more second sounds includes slowing down movement of the vehicle system, stopping the movement of the vehicle system, or changing which route the vehicle system is moving along.

4. The method of claim 1, wherein the value of the signal that is determined represents a planned or predicted moving speed of the vehicle system.

5. The method of claim 1, wherein the one or more first sounds are filtered by one or more of removing one or more frequencies from the sounds that are detected or reducing one or more amplitudes of the one or more frequencies of the sounds that are detected.

6. The method of claim 5, wherein the one or more frequencies are associated with the one or more first sounds.

7. The method of claim 5, wherein the one or more frequencies of the one or more first sounds are associated with one or more of engine noise, wind noise, or noise generated by movement of the vehicle system.

8. The method of claim 1, wherein filtering out the one or more first sounds includes converting an analog signal of the sounds to a digital signal of the sounds and converting the digital signal back to the analog signal.

9. A noise filtering system comprising:
a controller configured to determine a value of a signal associated with operation of a vehicle system, the controller also configured to filter out one or more first sounds of sounds detected by a sensor onboard the vehicle system based on the value of the signal that is determined, the controller configured to filter out the one or more first sounds responsive to the value of the signal exceeding a threshold, wherein one or more second sounds of the sounds remain after the one or more first sounds are filtered, the controller also configured to control operation of the vehicle system based on one or more second sounds of the sounds that remain after the one or more first sounds are filtered out from the sounds detected by the sensor, the controller configured to record the one or more second sounds responsive to the value of the signal exceeding the threshold and to record the one or more first sounds and the one or more second sounds responsive to the value of the signal not exceeding the threshold.

10. The noise filtering system of claim 9, wherein the controller is configured to one or more of slow down movement of the vehicle system, stop the movement of the vehicle system, or change which route the vehicle system is moving along as the operation of the vehicle system that is controlled based on the one or more second sounds.

11. The noise filtering system of claim 9, wherein the controller is configured to determine a planned or predicted moving speed of the vehicle system as the value of the signal.

12. The noise filtering system of claim 9, wherein the controller is configured to filter the one or more first sounds by one or more of removing one or more frequencies from the sounds that are detected or reducing one or more amplitudes of the one or more frequencies of the sounds that are detected.

13. The noise filtering system of claim 12, wherein the one or more frequencies are associated with the one or more first sounds.

14. The noise filtering system of claim 12, wherein the one or more frequencies of the one or more first sounds are associated with one or more of engine noise, wind noise, or noise generated by movement of the vehicle system.

15. A method comprising:
converting a first sound received by a first transducer into a first analog electrical signal;
converting a second ambient sound received by the first transducer or a second transducer into a second analog electrical signal;
comparing a value of a signal associated with operation, movement, or both operation and movement of a vehicle system to a reference value;
storing a digitized, unfiltered version of the first analog electrical signal responsive to the value of the signal being no greater than the reference value; and
storing a digitized, filtered version of the second analog electrical signal responsive to the value of the signal being greater than the reference value.

16. The method of claim 15, wherein the value of the signal is associated with a planned or predicted moving speed of the vehicle system.

17. The method of claim 15, wherein the digitized, filtered version of the second analog electrical signal includes frequencies filtered from a frequency spectrum associated with the second analog electrical signal, the frequencies associated with one or more of wind noise, engine noise, or brake system noise.

18. The method of claim 15, further comprising changing an operational state of the vehicle system based on the digitized, filtered version of the second analog electrical signal.

* * * * *